Dec. 31, 1968 L. A. AMTSBERG ETAL 3,419,087

TORQUE CONTROLLED ELECTRIC NUT-RUNNER WITH SOLENOID BRAKE

Filed March 30, 1967

INVENTOR
LESTER A. AMTSBERG
BY WILLIAM K. WALLACE

ATTORNEY

United States Patent Office 3,419,087
Patented Dec. 31, 1968

3,419,087
TORQUE CONTROLLED ELECTRIC NUT-RUNNER WITH SOLENOID BRAKE
Lester A. Amtsberg, Utica, and William K. Wallace, Barneveld, N.Y., assignors to Chicago Pneumatic Tool Company, New York, N.Y., a corporation of New Jersey
Filed Mar. 30, 1967, Ser. No. 627,053
16 Claims. (Cl. 173—12)

ABSTRACT OF THE DISCLOSURE

A torque controlled nut-running tool operated by an electric motor and having control switch mechanism arranged to function in response to a disengaging clutch action upon delivery of a maximum controlled torque by the tool to the work to cut off power to the motor and to simultaneously cause a solenoid operable disc brake to brake the motor to a stop.

---

Figures 1, 2:
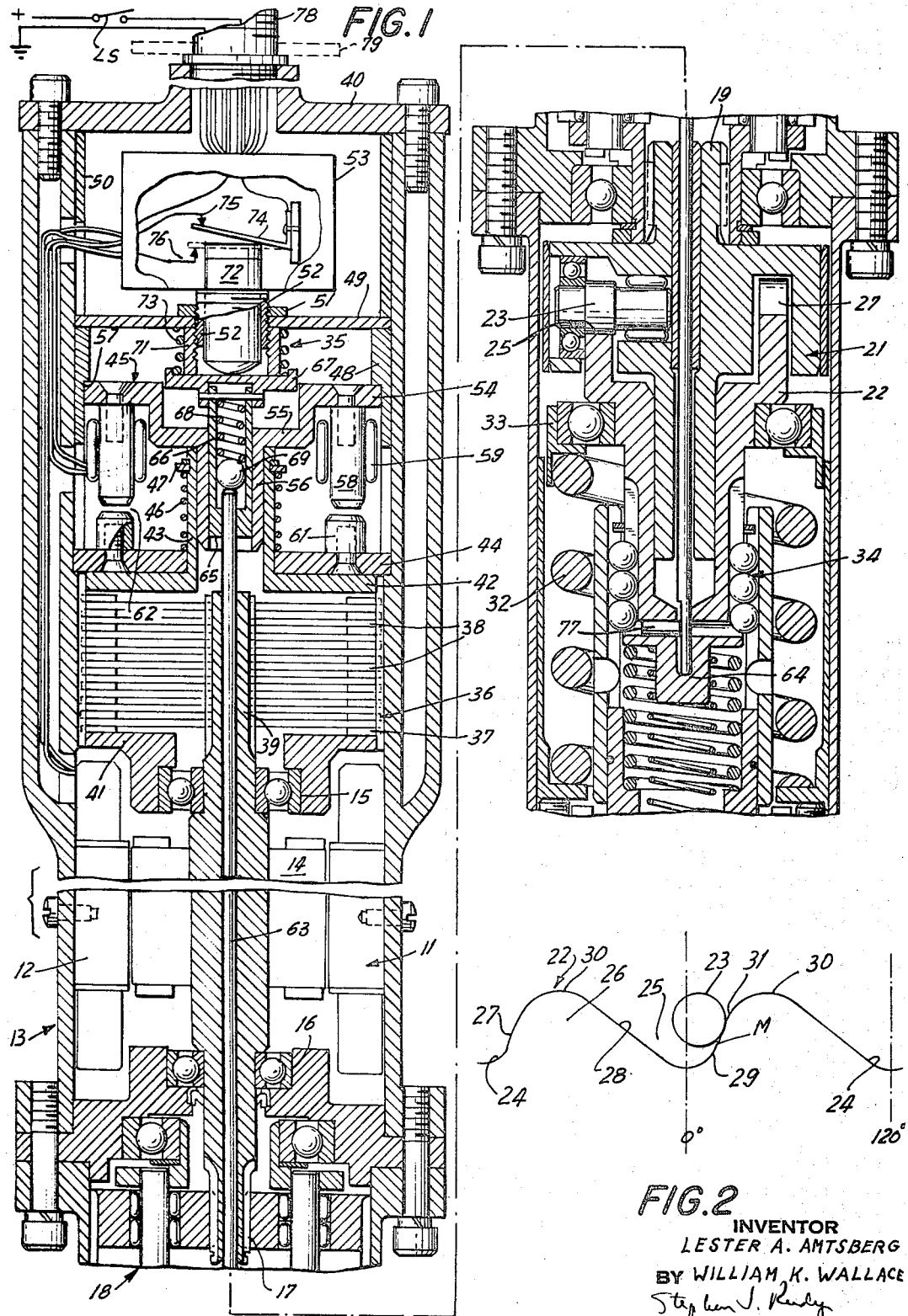

The invention relates to the art of a torque controlled electric nut-running tool having electrically operable braking means to stop rotation of the motor upon delivery of a controlled torque to the work.

Torque controlled nut-running tools with motor braking mechanisms are known from co-pending applications Ser. No. 508,049, filed Nov. 16, 1965 now Patent No. 3,354,754 and Ser. No. 572,753, filed Aug. 16, 1966, now Patent No. 3,400,633, dated Sept. 10, 1968. These, however, are pneumatically powered and the braking mechanisms are not of an electrically operable nature.

In accordance with the invention there is provided a nut-running tool including a torque responsive cam clutch, an electrically powered motor for transmitting the torque of the motor to the clutch, brake means for braking the motor, solenoid means for effecting operation of the brake means, the clutch including a driving and a driven member, one being movable axially relative to the other upon a predetermined torque being realized, and control switch means responsive to a predetermined axial movement of the one clutch member to terminate electrical power to the motor and to establish electrical power to the solenoid means.

In the accompanying drawings:

FIG. 1 is a view in vertical section with some parts broken away for convenience of illustration of a nut-running tool embodying the invention; and FIG. 2 is a development view of a cam lobe of the driven clutch member showing a roller on the foreward cam slope just beyond the point of maximum torque delivery.

Attention is directed to the figures of the drawing, wherein is shown a controlled torque nut-running tool operated by an electric motor 11. The motor's stator 12 is fixed to the housing generally indicated at 13, and the shaft of its rotor 14 is journaled in bearings 15 and 16. The output end 17 of the rotor shaft is drivingly coupled by reduction gearing 18 to a driving part 19 of a torque responsive spring loaded rotary cam clutch, generally designated 21. Clutch part 19 has a cam driving engagement with a driven clutch part 22. This engagement is here defined by a group of three rollers 23, one being shown, spaced one hundred twenty degrees apart, carried by the driving clutch part 19. In the engaged condition of the clutch each of the rollers is normally seated on an inside radius 24 (FIG. 2) forming the bottom of a separate cam pocket 25 of the driven clutch part. Each pocket is separated from the next by a cam lobe 26, the crest 30 of which connects a relatively steep forward cam slope 27 of one pocket with a long gradually declining back slope 28 of the next pocket. The depth of the pockets is substantially greater than the diameter of the rollers. The forward cam slope 27 is defined by an inside radius portion 29 in continuation of the bottom of the pocket, which radius changes smoothly over about the point M of the slope into a declining outside radius 31. The driven clutch part 22 has axial movement relative to the driving clutch part, and is normally biased into clutched engagement with the driving part by means of a clutch return spring 32 acting through a bearing cup 33.

The driven clutch part has a slidable splined driving connection with output spindle means, generally indicated at 34. The spindle means is adapted at its terminal portion (not shown) for engagement with a threaded fastener, such as a nut.

As torque builds up to a predetermined degree in the driven clutch part 22 in a work operation, the driving clutch part 19 upon experiencing the overload advances rotatively relative to the driven clutch part and forces the rollers 23 up the forward slopes 27. In this action, the driven clutch part is forced in a disengaging axial movement downwardly against the clutch return spring 32. A maximum or controlled torque will be transmitted by the rollers to the driven clutch part as the rollers ride over the points M of the forward slopes. The forward slopes decrease beyond the points M at a rate equal to the increase in the load developing in the clutch spring 32 as the rollers move beyond the points M. The upper slope area 31 beyond the points M and before the crest 30 provides a constant torque delivery portion of the cam slope. While the rollers move over this latter portion, the controlled torque delivered does not exceed the maximum and remains substantially constant.

At about the time that the rollers have moved over the points M onto the constant torque delivery portions of the cam slopes, switch mechanism 35 located in the upper part of the tool is caused by the axial movement of the driven clutch part 22 to cut off electric power to the motor and to simultaneously establish an energizing circuit to solenoid operable braking mechanism 36 to brake the motor to a stop before the residual energy in the motor after power cut-off can carry the rollers over the cam crests into the next pockets to reengaged condition.

The braking mechanism 36 includes a compressible brake disc pack comprising a group of outer friction disc rings 37 which are splined to a surrounding wall of the housing and are interleaved with a group of inner disc rings 38 splined to an extended upper portion 39 of the rotor shaft. The disc pack rests upon a stationary circular back plate 41 fixed at its periphery to the housing and mounted axially upon the rotor bearing 15. A circular pressure plate 42 is movable to pressurize or compress the disc pack to effect a braking action upon the rotor. A tubular stem portion 43 of the pressure plate extends slidably upward through an axial opening of a stationary or fixed circular base plate member 44 of a solenoid means 45. A compression spring 46 limited between the base plate 44 and a washer abutment 47 of stem 43 biases the pressure plate 42 to an elevated normal condition (as in FIG. 1), wherein it does not exert any compressive force upon the disc pack. In this normal condition, the pressure plate 42 abuts the underside of the base plate 44 clear of the disc pack so that the disc pack is relaxed.

The solenoid means 45 is operable to actuate the brake disc pack. Here, this means includes a stationary cylindrical casing 48 seated upon the base plate 44. A cover plate 49 is held in pressed abutment upon the top end of casing 48 by means of a sleeve 50 which in turn is clamped in place by the housing cover 40. An overhead switch box 53 has an externally threaded bushing 52 that depends axially through the cover plate 49 into the interior of the solenoid casing 48 and is clamped to the cover plate 49 by means of a threaded bushing 71 and a lock-nut 51.

A plunger plate 54 of circular configuration has an annular centrally recessed wall 55 which abuts the top end of the tubular stem 43 of the pressure plate. A cylindrical stem 56 of the plunger plate is sleeved by the stem 43 of the pressure plate; and the peripheral wall of the plunger plate bears for relative slidable movement upon a recessed surrounding wall 57 of the casing. Spaced around the underside of the pressure plate and fixed thereto is a ring of equally spaced solenoid cores 58 (two being shown) each of which depends through a separate stationary solenoid coil 59 in opposed relation to a separate post 61 fixed upon the base plate 44. When the coils are energized, the several cores move to pull the plunger plate 54 downward, whereby the pressure plate 42 is forced downward against its return spring 46 to compressively pressurize the disc pack sufficiently to brake rotation of the rotor. A uniform clearance 62, existing between the ring of solenoid cores and the ring of posts is sufficient to insure that the extent of downward movement of the cores and pressure plate is determined by the disc pack and not the posts 61. When the coils are deenergized, the pressure and plunger plates are returned to normal by spring 46.

The switch mechanism 35 is designed to be actuated by means of a slidable control rod 63 upon a predetermined axial disengaging movement of the driven clutch part relative to the driving clutch part. The control rod depends axially and slidably of the rotor, the clutch parts and the intermediate reduction gearing. The bottom of the rod abuts the bottom of a bore 64 of the driven clutch part. The top end of the rod projects from the rotor shaft. The rod further projects slidably through a bottom wall 65 of a sleeve 66 part way into the interior of the latter. Fixed to the top of the sleeve is a switch rest plate 67. Because of the normally engaged condition of the clutch and the elevated condition of the rod, a switch control spring 68 compressed between the rest plate 67 and a ball 69 seated atop the rod biases the sleeve upwardly to hold the rest plate in abutment with a bushing 71 against the resistance of a spring 73. The bushing 71 is threaded upon the lower end of the switch box bushing 52. In its elevated condition, the switch rest plate 67 presses upon a slidable slug 72 and holds it in an elevated condition. An insulated top end of the elevated slug presses a spring contact arm 74 in an electrical circuit closed upon a motor circuit contact 75 and clear of a solenoid circuit contact 76.

The operation of the tool is as follows. Closing of a main line switch LS establishes a circuit through normally closed motor contact 75 to energize the motor. The rotating rotor transmits its torque through the reduction gearing 18 and engaged clutch 21 to the work. As torque builds up to a predetermined degree in the work and driven clutch part, the driving clutch part upon experiencing the overload forces its rollers 23 up the forward cam slopes 27. As the rollers move up the slopes, they cam the driven clutch part axially downward against the resistance of the clutch spring 32. The control rod 63 slidably drops as the clutch part moves axially; and the ball 69 in sleeve 66 follows the movement of the rod and the driven clutch part under the relaxing force of the switch control spring 68. At about the time that the rollers ride over the points M, a controlled or pre-set maximum torque is delivered by them through the driven clutch part to the work. At about this time, the control rod will have dropped sufficiently to allow the ball 69 to engage the bottom wall 65 of the sleeve 66 thus removing the upwardly biasing force of the control spring 68 from the switch rest plate. The switch rest plate spring 73 then relaxes in response to this action to slide the sleeve downwardly, permitting the slidable slug 72 to drop with the sleeve sufficiently to allow the spring contact arm 74 to relax clear of the motor circuit contact and close upon the solenoid circuit contact 76. By the time the sleeve is forced downward by the switch rest plate spring 73, the control rod will have dropped with the driven clutch part far enough to avoid its rising back into the sleeve to re-compress the control spring 68.

Power to the motor is cut off as the motor circuit contact 75 opens; and the solenoid coils are energized as the solenoid circuit contact 76 closes. As a consequence, the plunger plate 54 is pulled downwardly by the solenoid cores 58 forcing the pressure plate 42 to pressurize the brake disc pack and stop further rotation of the rotor. The rollers will have been brought to a halt after having travelled beyond the points M for a few degrees onto the constant torque portion 31 of the cam slope 27 and before they can ride over the crests 30 of the cam lobes into re-engagement with the next pockets.

The rollers will be held in this braked condition upon the forward cam slopes 27 by the pressurized brake pack against the resistance of the clutch spring 32, until the operator opens the main line switch LS to normalize the tool; or until the torque of the work should, for some reason, become relaxed sufficiently to allow the spring loaded driven clutch part to restore. In the latter situation, the tool will normalize as the control rod is restored and will resume operating as before.

The time at which sleeve 66 will drop sufficiently to cause shifting of the contact arm 74 may be regulated by elevating or lowering the switch box 53 with respect to the cover plate 49 and then locking it in place by means of the threaded bushing 71 and the lock nut 51. This will also determine the distance the rollers 23 will ride up the forward cam slopes 27 before the motor is braked to a stop.

The solenoid operated braking mechanism 36 increases the utility of a tool of this nature in that it permits a plurality of the same tools to be used in a gang arrangement controlled by a suitable circuit for multiple nut-running operations. In such an arrangement, each tool will be individually coupled by means of an adapter 78 at its top end to a gang plate 79, and all of the tools will be supplied with current from a common source. It is clear that in such an arrangement each tool will be braked to a stop independently of the others as soon as it has delivered a controlled torque to the work. When the operator observes all of the tools to have been braked, he may then open a main supply switch to simultaneously cut off power to all of the tools. A suitable monitoring circuit may also be readily associated with the circuits of the several tools to recognize final delivery of controlled torque by all of the tools and then automatically terminate current flow to the several tools.

What is claimed is:

1. A torque controlled electric nut-running tool including a torque responsive cam clutch, an electrically powered motor for transmitting the torque of the motor to the clutch, brake means for braking rotation of the motor, solenoid means for effecting operation of the brake means, the clutch including a driving and a driven part, one part being movable relative to the other upon a predetermined torque being realized, and control switch means responsive to a predetermined extent of movement of the one clutch part to terminate electrical power to the motor and to establish electrical power to the solenoid means.

2. A torque controlled electric nut-running tool as in The solenoid means 45 is operable to actuate the brake disc pack engaging the rotor of the motor.

3. A torque controlled electric nut-running tool as in claim 2, wherein the solenoid means includes a pressure transmitting plunger mechanism having cooperation with the disc pack upon energization of the solenoid means so as to pressurize the disc pack to braking condition.

4. A torque controlled electric nut-running tool as in claim 1, wherein the control switch means includes a switch having a normal condition closing a circuit to the motor and a reverse condition closing a circuit to the solenoid means, and a switch actuating means having movement with the movable clutch part for reversing the condition of the switch from one condition to the other.

5. A torque controlled electric nut-runner comprising an electric motor, an output spindle, a torque releasable cam clutch coupling the motor to the spindle, a brake for braking rotation of the motor, solenoid means energizable to actuate the brake to braking condition, electrical circuit switch means normally closed to the motor and open to the solenoid means, and switch actuating control means responsive to releasing action of the clutch to open the switch means to the motor and to close it to the solenoid means.

6. In a torque controlled electric nut-running tool, including an electric motor, an output spindle, a torque disengageable cam clutch arranged to transmit the torque of the motor to the spindle, the clutch having driving and driven clutch parts, the driven clutch part having axial disengaging movement relative to the driving part upon the latter experiencing torque overload, and an electrical circuit for the motor; the improvement comprising solenoid operable brake means for braking rotation of the motor, and control means responsive to the disengaging movement of the driven clutch part to open the circuit to the motor and to close the circuit to the solenoid operable brake means.

7. In a torque controlled electric nut-running tool as in claim 6, wherein the solenoid operable brake means includes a compressible brake disc pack engaging the rotor of the motor, and solenoid means operable to exert a compressive force upon the pack.

8. In a torque controlled electric nut-running tool as in claim 7, wherein the rotor of the motor has an extended shaft portion, a casing houses the disc pack, and the disc pack comprises a group of outer discs engaging the casing and a group of inner discs interleaved with the outer discs and engaging the extended shaft portion.

9. In a torque controlled electric nut-running tool as in claim 7, wherein a pressure plate is movable relative to an end of the disc pack to exert a compressive force upon the pack.

10. In a torque controlled electric nut-running tool as in claim 9, wherein the solenoid means includes plunger core means, a plunger plate fixed to the core means for movement with the latter, and means associating the pressure plate for movement in unison with the plunger plate so that the plunging force of the plunger plate is transmissible through the pressure plate to the disc pack.

11. In a torque controlled electric nut-running tool as in claim 10, wherein return spring means normally biases the pressure plate and the associated plunger plate to a normal condition in which the disc pack is relaxed.

12. In a torque controlled electric nut-running tool as in claim 10, wherein the casing includes a base plate having posts mounted thereon in opposed uniform spaced relation to the plunger core means, the spacing of the posts relative to the core means being greater than the distance the pressure plate is required to move to exert a compressive braking force upon the pack.

13. In a torque controlled electric nut-running tool as in claim 6, wherein the driven clutch part includes a succession of cam pockets separated one from the other by a cam lobe, each lobe having a forward cam slope, the driving clutch part carries a group of cam rollers each engaged in one of the cam pockets, and the driving clutch part is adapted under overload to advance rotatively relative to the driven clutch part to cause the rollers to ride up the cam slopes and cam the driven clutch part in an axial disengaging direction.

14. In a torque controlled electric nut-running tool as in claim 7, wherein the control means includes a switch in the circuit having a normal first condition closing the circuit to the motor and having a shifted condition opening the circuit to the motor and closing the circuit to the solenoid means.

15. In a torque controlled electric nut-running tool as in claim 14, wherein the control means further includes mechanism normally holding the switch in its first condition and responsive to axial disengaging movement of the driven clutch member to shift the switch to its second condition.

16. In a torque controlled electric nut-running tool as in claim 6, wherein the control means includes a first electrical contact for closing the circuit to the motor, a second electrical contact for closing the circuit to the solenoid operable brake means, an electrical spring contact arm having a relaxed condition closing the circuit through the second contact and having a moved condition from the second contact closing the circuit through the first contact, switch control slide means abutting the driven clutch part normally having an elevated condition in the engaged condition of the clutch holding the spring contact arm moved to closed condition upon the first contact, and the slide means being arranged to follow the axial disengaging movement of the driven clutch part sufficiently to allow the spring contact arm to relax to closed condition upon the second contact.

References Cited

UNITED STATES PATENTS

| | | | |
|---|---|---|---|
| 1,942,825 | 1/1934 | Meunier | 192—2 |
| 2,257,610 | 9/1951 | Kraft | 192—2 |
| 3,331,452 | 7/1967 | Wanner | 173—12 |

ERNEST R. PURSER, *Primary Examiner.*

U.S. Cl. X.R.

192—2, 144

UNITED STATES PATENT OFFICE
CERTIFICATE OF CORRECTION

Patent No. 3,419,087                                                          December 31, 196

Lester A. Amtsberg et al.

It is certified that error appears in the above identified patent and that said Letters Patent are hereby corrected as shown below:

Column 4, lines 67 and 68, cancel "The solenoid means 45 is operable to actuate the brake disc pack engaging the rotor of the motor." and insert -- claim 1, wherein the brake means is a pressurizable brake disc pack engaging the rotor of the motor. --.

Signed and sealed this 10th day of March 1970.

(SEAL)
Attest:

Edward M. Fletcher, Jr.                                WILLIAM E. SCHUYLER, JR.
Attesting Officer                                                 Commissioner of Patents